No. 866,552. PATENTED SEPT. 17, 1907.
S. B. YERION.
REPEATER FOR PHONOGRAPHS.
APPLICATION FILED OCT. 10, 1906.
2 SHEETS—SHEET 1.
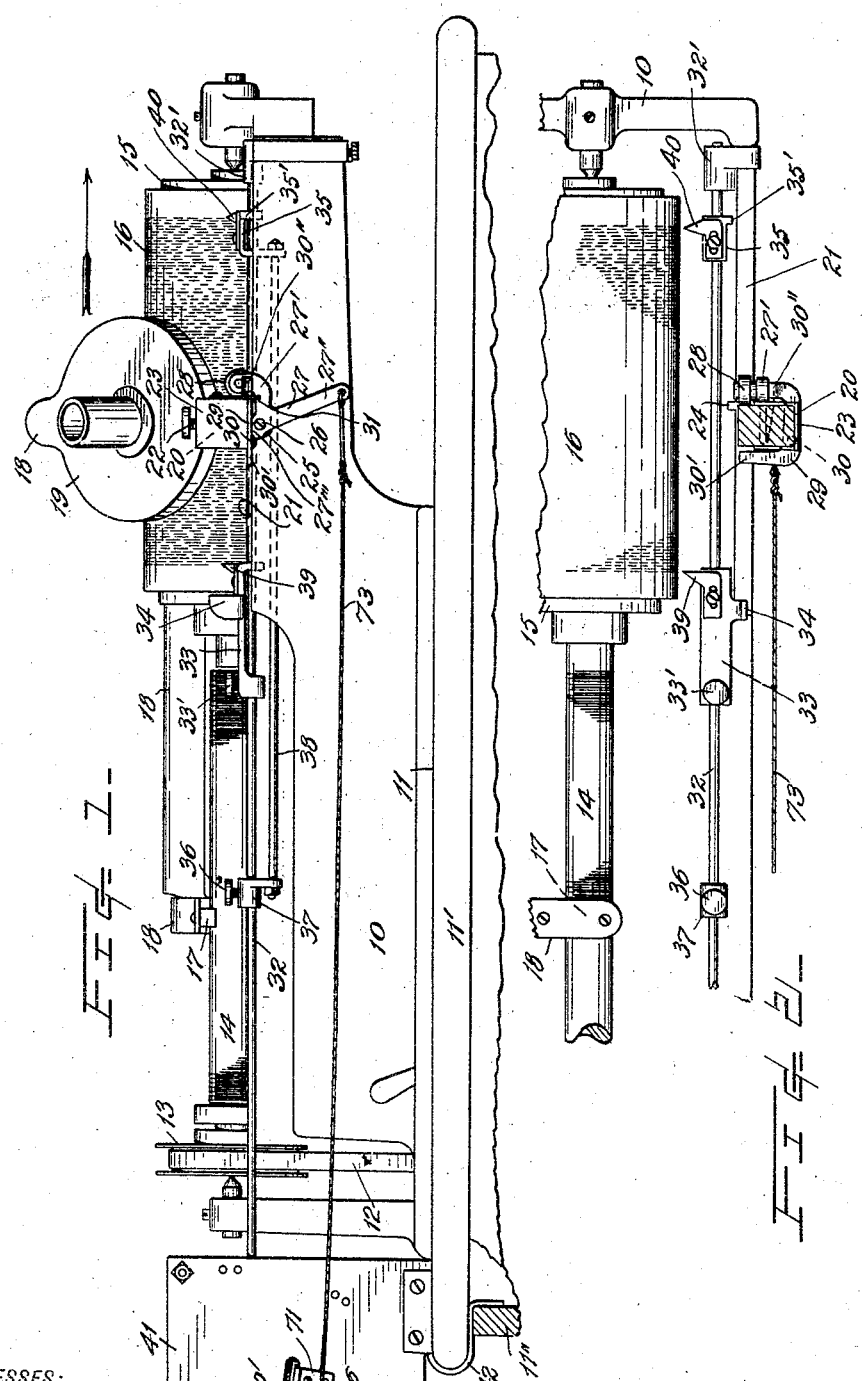
WITNESSES:
Horace Barnes
W. T. Gibson.
INVENTOR
Sidny B. Yerion
BY
Pierre Barnes
ATTORNEY No. 866,552. PATENTED SEPT. 17, 1907.
S. B. YERION.
REPEATER FOR PHONOGRAPHS.
APPLICATION FILED OCT. 10, 1906.
2 SHEETS—SHEET 2.
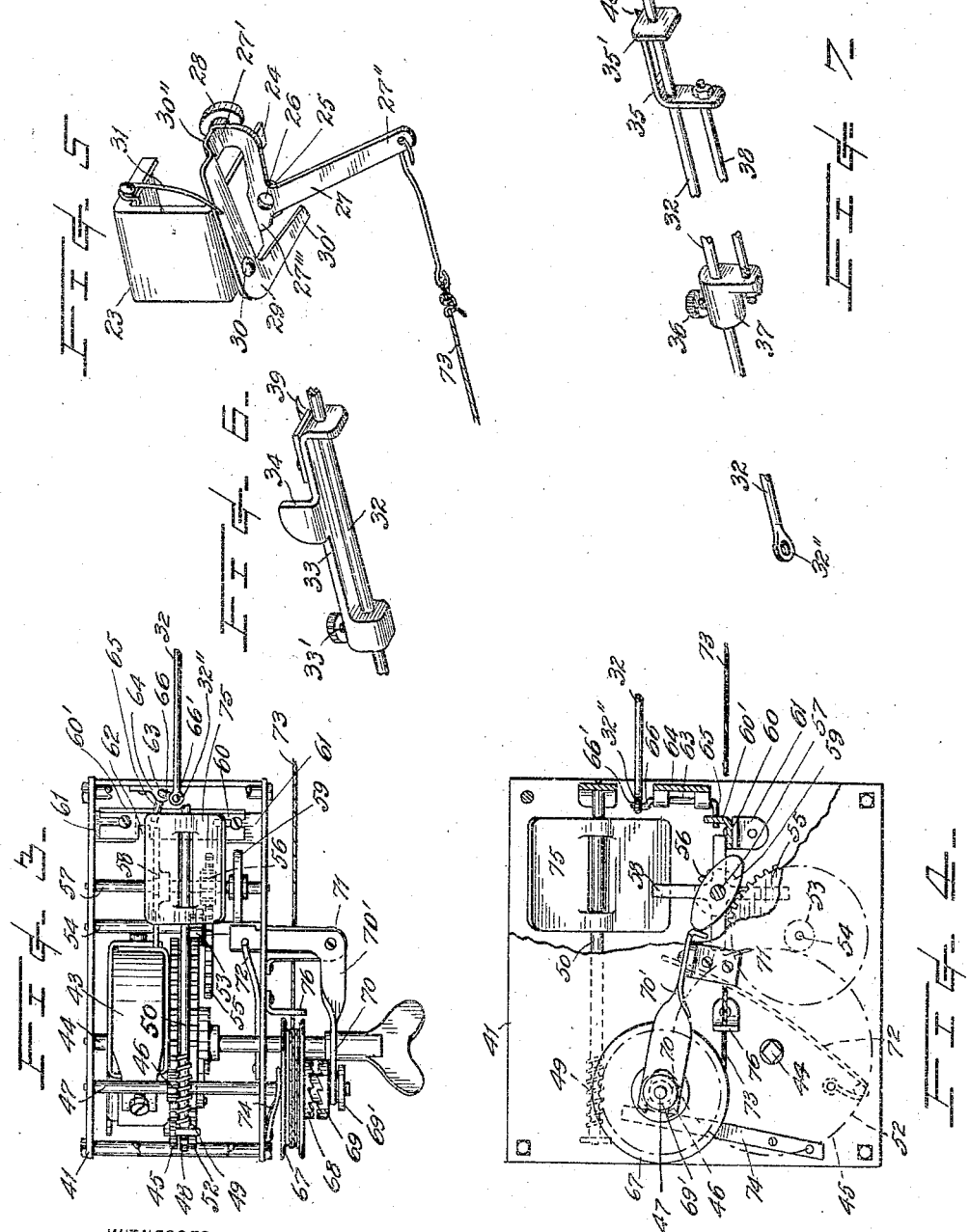
WITNESSES:
Horace Barnes.
W T Gibson.
INVENTOR
Sidny B. Yerion
BY
Piesse Barnes
ATTORNEY

UNITED STATES PATENT OFFICE.

SIDNY B. YERION, OF SEATTLE, WASHINGTON.

REPEATER FOR PHONOGRAPHS.

No. 866,552.   Specification of Letters Patent.   Patented Sept. 17, 1907.

Application filed October 10, 1906. Serial No. 338,260.

*To all whom it may concern:*

Be it known that I, SIDNY B. YERION, a citizen of the United States, residing at Seattle, in the county of King and State of Washington, have invented certain new and useful Improvements in Repeaters for Phonographs, of which the following is a specification.

This invention relates to phonographs and other talking machines; and its object is to provide a mechanically operated attachment to such a machine whereby the music rendered by the reproducer may be automatically repeated either in whole or in part.

With this end in view the invention consists in the novel construction, and combination of devices as will be hereinafter described and claimed.

In the accompanying drawings forming part of this specification, Figure 1 is a front elevation of a phonograph with devices embodying my invention attached; Fig. 2, a fragmentary plan view of the same with the reproducer omitted; Fig. 3, an enlarged plan view of a portion of the apparatus; Fig. 4, a front elevation of the parts shown in Fig. 3 with a part of the framework broken away; and Figs. 5, 6 and 7, detail perspective views of parts of the invention shown detached.

In said drawings, the reference numeral 10 indicates the phonograph frame which is mounted, as ordinary, upon the box 11 containing the motor for driving the operative parts thereof through the medium of a belt 12 passing about a pulley 13 upon the spindle 14. This spindle is journaled in suitable bearings of the frame, is finely screw-threaded, and carries upon an extension a cylinder 15 for the record 16. The screw serves through a nut 17 and connecting parts 18 to feed the sound reproducer 19, containing the diaphragm and a stylus, so that the latter will follow the helical indentations of the record, and is prevented from unduly bearing upon the record by a block 20 slidable on the striaght-edge 21 of the frame 10. All of the aforesaid parts are, or may be, of ordinary construction, found in certain classes of phonographs.

Detachably connected to the block 20, as by a set screw 22, is a casing-like structure 23 provided with a rearwardly protruding finger 24, and a downwardly extending ear 25 whereto is fulcrumed by screw 26 a bellcrank 27 having a lateral arm 27′, a pendent arm 27″, and a lug 27‴ disposed oppositely of the first named arm and arranged to contact with the bottom of the casing, to limit the swing of the crank in one direction. The arm 27′ carries an anti-friction roller 28 positioned immediately above said straight-edge 21 and adapted when forced by the action of the bell-crank thereagainst to elevate the block 20 and so raise the stylus from the record.

29 is a bell crank fulcrumed by a screw 30 to the under side of the casing with one of its arms, 30′, extending rearwardly at the left hand side of the block, while the other arm, 30″, has its outer end pressed normally against the crank arm 27′ through the action of a suitable spring, such as 31. When the block, as above stated, is elevated, then the arm 30″ of the crank 29 is correspondingly raised, and when above the height of the crank-arm 27′ is thrust there-above by the force of said spring, and maintains the block in such raised position until the crank 29 is tripped, as presently described.

Adjacent of the straight-edge 21 and extending longitudinally of the frame 10, is a drag-bar 32 which is slidably seated at one end in a support 32′, the latter detachably connected to the frame, while the other end is connected with the motion controller of the repeater actuating devices.

Adjustably seated upon the bar 32 and to the left hand side of the record cylinder, is an attachment 33, see Fig. 6, which is secured in predetermined adjusted positions by means of a set screw 33, and has at its front a protruding lug 34 positioned so as to interfere with the crank-arm 30′ when the retrograde travel of the reproducer has caused it to be brought to the terminus of its reverse course, as controlled by the positioning of said attachment, and swerving the crank arm 30″ from its engagement with the arm 27′ for releasing the block from its poised condition. Another attachment 35 is slidably seated upon said drag bar to the right hand end of the record cylinder, and is secured in adjusted position by a set screw 36 which, for convenience in manipulating, is employed in an auxiliary attachment 37 towards the opposite end of the bar, and these last mentioned attachments are operatively coupled together by a reach-rod 38, as shown in Fig. 1.

The attachment 35 is provided with a forwardly extending ear 35′ for the purpose of forming an abutment against which the finger 24 of the shell will strike at the end of the travel to effect the shifting of the bar 32 and cause the operating mechanism to be actuated. Adjustably connected with the attachments 33 and 35, respectively, are pointers 39 and 40 which are used in indicating the exact positions at which the attachments are to be located to effect the purposes before explained; for example, the attachment 33 would be set so as to present the pointer 39 at the beginning of the indentations of the record the music of which is intended to be repeated, while the other attachment 35 is set with its pointer 40 at the end of the music.

Referring now to Figs. 1, 3 and 4, showing mechanism for automatically actuating the return movements of the reproducer and raising and lowering the same clear of and upon the record, 41 is a containing case adapted to be secured to the box 11 in any suitable manner, as by a clip 42 introduced between the cover 11′ and the adjacent end 11″. Within this casing is a clock-work mechanism consisting of a train of wheels driven from a power spring 43 upon a winding arbor 44, and imparting motion through the gear wheels 45 and 46 to an arbor 47 carrying a worm wheel 48 engaging a worm pinion 49 upon a longitudinal arbor 50, whereupon is a speed retarding fan 75. The arbor 47 likewise rotates, through wheels 52 and 53, an arbor 54, which in turn is geared by wheels 55 and 56 with an arbor 57, the latter having fixedly mounted thereon an escapement 58 and a cam 59. A plate 60 reciprocally seated upon supports, such as 61, within the casing, is provided with a notch 62, and is shifted from side to side by means of the aforesaid drag-bar 32 to permit of the arms of the escapement successively passing through the slot, and its motion intermittently arrested by the arms of the escapement being individually caught by the plate upon either side of the notch. An advantageous connection between the plate 60 and the drag bar is the employment of a vertically disposed rod 63 carried in bearings 64, and provided with bent ends 65 and 66 which are respectively engaged with the plate by passing through a notched flange 60', and with the bar by forming a crank-pin extremity 66' to receive an eye 32'' of the bar. The arbor 47 has mounted thereon a normally loose spool 67 which upon occasion is coupled therewith by clutch elements 68 and 69 respectively formed on the spool and a peripherally grooved hub 69' splined to the arbor. The hub of the clutch member 69 is connected to the forked arm 70 of a bell-crank 70' which is fulcrumed to a bracket 71 of the casing, and has its other arm engaged with the perimeter of said cam 59 which, being elliptical, will in rotating alternately thrust the clutch element 69 out of mesh with the other element against the action of a spring 72, and then allow the latter to assert itself to again couple such elements. 73 is a flexible line having one of its ends affixed to the spool and passing through an aperture of a fair-leader 76 has its other end connected with the pendent arm 27'' of the bell-crank 27, whereby, as the line is wound about the spool, it serves to tilt the crank arm to elevate the block 20 from the straight edge 21 and by a continued action retracts the reproducer. 74 is a brake-spring pressing frictionally against said spool to prevent the latter upon being released by the clutch from turning with too great a velocity.

The operation of the invention is as follows: The record being placed upon the cylinder 15 of the phonograph, the attachments 33 and 35 would be secured to the bar 32 so that the respective pointers 39 and 40 would be opposite the ends of the record markings. The phonograph is now started and the reproducer brought into juxtaposition with the attachment 33 by pushing it along toward the left by finger pressure exerted against the crank-arm 27'', or by moving the bar 32 to the right to actuate the repeating mechanism. In either case the reproducer is raised sufficiently to permit the spring-pressed crank-arm 30'' to be engaged with the arm 27' and holds the reproducer in such elevated condition until disengaged by the impinging of the arm 30' against abutment 34, with the resultant lowering, as before explained, of the feed nut 17 and the reproducer into operative engagement with the screw spindle and with its stylus upon the record. The striking of the abutment also forces the drag-bar to be moved to shift the notch 62 of plate 60 across the plane of the escapement wheel arms, meanwhile allowing this wheel to make a partial rotation, and the cam 59 brought to present one of the ends of its major diameter against the crank 70' to disengage the clutch elements, thereby causing the spool 67 to be loose and offer no resistance to the unwinding of the line 73 as the reproducer is progressively moved by the phonograph motor in the direction indicated by arrow in Fig. 1.

When the reproducer has reached the end of its travel, as controlled by the adjustment of the attachment 35, the finger 24 will strike the portion 35' of the latter to cause the movement of the rod 32 and tripping of the plate 60 to move the nut 62 in position opposite the paths of the arms 58 of the escapement and thus release the latter and the cam 59 and permit the clutch to be coupled and cause the line 73 to be wound about the spool, which raises the reproducer and drags it into contact with the attachment 33, thus effecting the purpose of the invention by repeating the music. More specifically, when the drag-bar is moved toward the right by the interference of the attachment 35, as above explained, the plate 60 is shifted to permit the escapement wheel 58 to make a quarter turn, and the cam being correspondingly moved brings an end of its minor diameter to oppose the crank 70', and allows the spring 72 to assert itself to couple the clutch elements and fix the spool to its arbor, which being now active winds in the line to accomplish the reverse movement of the reproducer. During this step in the operation, one of the escapement wheel arms 58' is directed toward the fan and, being shorter than either of the others does not protrude within the path of travel of the fan-wings, so that the latter being unrestrained allows the clock-work to operate and coincidentally regulate the speed thereof. The clock-work continues to operate until the plate has again been shifted to afford a quarter turn to the wheel 58 and bring one of the longer arms thereof into the path of the fan, thus stopping the action of the clock-work and at the same time disengaging the clutch, which occurs as the reproducer is lowered.

With the present invention, the operation of the return of the reproducer to make repetition of the music is accomplished by an independent motor, is rapid in action, and works in an efficient manner and without any apparent jar or shock.

Having described my invention, what I claim, is—

1. In a device of the class described a reproducer, a record, a spring actuated mandrel having a winding drum, a trip mechanism carried by said reproducer, a winding cable between said trip mechanism and drum, a trip mechanism adapted to hold said drum out of action, spaced abutments in the path of said reproducer, and connecting means between said abutments and the trip mechanism of said drum.

2. In a device of the class described a reproducer, a record, a supporting frame, a spring actuated mandrel carried by said frame, a winding drum operated by said mandrel, escapement device connected to said mandrel, a stop movable into the path of said escapement, means operative by said escapement for holding said winding drum out of action, a trip mechanism carried by said reproducer, a winding cable between said trip mechanism and drum, spaced abutments in the path of said reproducer, and connecting means between said abutments and said escapement stop.

3. In a device of the class described a reproducer, a record, a supporting frame, a spring actuated mandrel carried by said frame, a winding drum operated by said mandrel, escapement device connected to said mandrel and including a fan device and a wheel formed with a plurality of spaced radiating arms movable into the path of said fan, a plate movable transversely of the path of said radiating arms and provided with a notch adapted to permit the arms to pass when the plate is disposed in one position, means operative by said escapement for holding said winding drum out of action, a trip mechanism carried by said reproducer, a winding cable between said trip mechanism and drum, spaced abutments in the path of said reproducer, and connecting means between said abutments and said recessed plate and adapted to actuate the same when the reproducer engages the abutments.

4. In a device of the class described a record, a repeating mechanism, a reproducer, a casing connected to said reproducer and provided with a laterally extending stop, a movable rod, abutments spaced apart upon said rod, a trip mechanism carried by said shell, a winding drum carried by said repeating mechanism, a cable connected between said drum and the trip mechanism of said reproducer, connecting means between said rod and repeating mechanism, means whereby said rod is operated by the contact of said shell with one of said abutments, and means whereby the trip mechanism of said shell is operated by the contact thereof of the other said abutment and the winding drum set into operation.

5. In a device of the class described a reproducer, a record, a supporting frame, a spring actuated mandrel carried by said frame, a winding drum having a clutch member and operated by said mandrel, escapement device connected operatively with said mandrel and including a fan device and a mandrel carrying a cam and a wheel having a plurality of radiating arms adapted to move intermittently into the path of said fan device, a clutch member movably disposed relative to the clutch member of said winding drum, a lever between said movable clutch member and said cam and adapted to be operated by the movement of the same, a plate movable transversely of the path of the radiating arms of said escapement wheel and provided with a notch adapted to permit said arms to pass when the plate is disposed in one position, a shell connected to said reproducer, a bell-crank swinging vertically from said shell, a bell-crank swinging horizontally from said shell with one arm movable into the path of one of the arms of said vertically swinging bell-crank, a movable rod carrying abutments spaced apart and disposed in the path of the reproducer, connecting means between said rod and said movable recessed plate, and a winding cable between said winding drum and the free end of said vertical bell-crank lever.

In testimony whereof I affix my signature in presence of two witnesses.

SIDNY B. YERION.

Witnesses:
PIERRE BARNES,
JOSEPH RISSE.